E. N. JOHA

KNITTED FOOTWEAR AND METHOD OF MAKING THE SAME

April 25, 1933.

Original Filed June 6, 1932

Re. 18,804

Inventor

Elmer N. Joha

By

Wheeler, Wheeler and Wheeler

Attorneys

BEST AVAILABLE COPY

Reissued Apr. 25, 1933 Re. 18,804

UNITED STATES PATENT OFFICE

ELMER N. JOHA, OF WAUWATOSA, WISCONSIN, ASSIGNOR TO RELIABLE KNITTING WORKS, OF MILWAUKEE, WISCONSIN, A CORPORATION OF WISCONSIN

KNITTED FOOTWEAR AND METHOD OF MAKING THE SAME

Original No. 1,888,172, dated November 15, 1932, Serial No. 615,605, filed June 6, 1932. Application for reissue filed January 5, 1933. Serial No. 650,342.

My invention relates to improvements in knitted footwear and methods of making the same. In a companion application, Serial No. 579,923, filed December 9, 1931, for knitted foot coverings and methods of making the same, I have disclosed a foot covering which may be manufactured from a strip of knitted fabric cut to the desired length and having zigzag selvedged side margins which are stitched together in such a manner that the ends of the blank form the ankle opening or top of the shoe, the middle portion forms the sole, and the wales or ribs extend vertically in the upper. Such blanks are cut from a continuous strip of knitted material, and therefore the ends require to be covered by an ankle encircling binding.

Objects of the invention herein disclosed are to provide an improved form of knitted blank, and to also provide means for utilizing such blanks to form knitted shoes having improved toe and instep covering portions, ankle embracing portions provided with selvedged margins, and all cut edges connected and, if desired, concealed at the heel.

Further objects are to provide a novel form of blank from which articles of footwear may be constructed which not only have selvedged edges at the ankle and cut ends stitched together to form the heel portions, but to provide a form of blank having zigzag portions peculiarly adapted to have their selvedged margins connected to form shoe toes with associated uppers, having wales or ribs extending from toe to heel and obliquely upwardly to the center line of the instep in such a manner as to utilize the tension of the threads to the best advantage for comfort, and for permanent conformity to the shape of the foot.

Further objects of my invention are to provide knitted footwear of improved shape, appearance, and durability; to provide means for reenforcing the heel and sole portions of such footwear to produce shoes having substantially impervious soles and continuously knitted uppers with selvedged ankle encircling margins; to provide blanks which may be made and sold as a commercial product of knitting mills for use by shoe manufactures in the construction of footwear; and in general to provide means whereby knitted fabrics of zigzag herringbone pattern and novel form may be utilized in the production of improved knitted footwear.

In the drawing.

Like parts are identified by the same reference characters throughout the several views.

Figure 1:
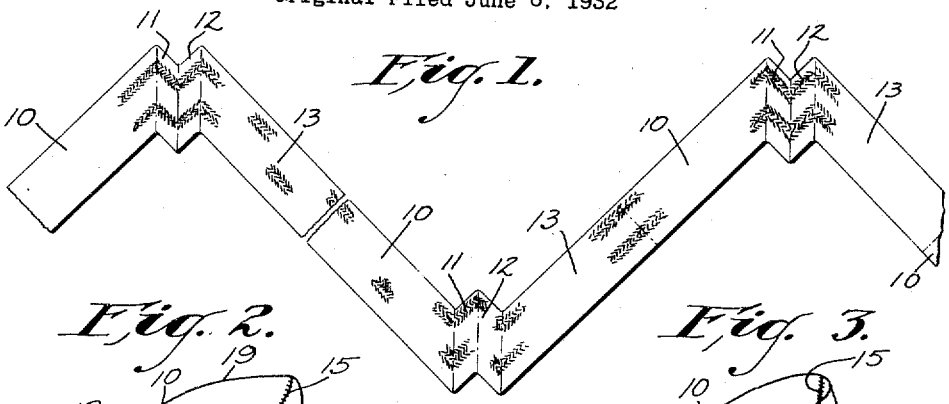
Figure 1 is a view of a strip of continuously knitted fabric having one end portion severed and constituting my improved footwear forming blank.

In the manufacture of my knitted footwear blanks I knit a continuous strip in a rack stitch of the familiar zigzag type, but I knit this strip in the form of an elongated band 10 extending obliquely across the general longitudinal axis of the strip, whereupon I reverse the inclination of the strip and knit a short extension 11 substantially at right angles to said band. I then again reverse the direction and knit a second short extension 12 parallel to the band 10, fol-

BEST AVAILABLE COPY lowed by a third reversal in the direction of inclination, after which I stitch a second elongated band 13 extending obliquely across the general longitudinal axial line of the strip substantially at right angles to the first mentioned band.

Upon completing the band 13, if additional blanks are desired, I continue the knitting in the same direction to produce a second band member 10 with associated zigzag extensions 11 and 12 which connect this second band member 10 with a second band member 13.

The second band member 10 will be inclined in the opposite direction from that of the first band member 10, and the second band member 13 will of course be parallel to the first band member 10. The zigzag extensions will, therefore, occur alternately on opposite sides of the general axial line of the strip.

The knitting of these bands and their connecting zigzag extensions may thus continue indefinitely. The ends of the associated bands and the connecting zigzag extensions form in each instance two projecting triangular points on the outer side of the angle formed by the adjacent bands and a single centrally located triangular point at the inner side of the angle, which is the converse of the V shaped notch between the two points on the outer side.

By making the intermediate band strips of a length double that required for the article of footwear to be formed from this knitted fabric, I am able to sever these band strips midway of their respective ends to produce blanks having the form indicated at the left in Figure 1. The line of severance will, of course, correspond to an imaginary line forming the junction of the members 10 and 13. It will be observed that each of the blanks thus formed comprises a set of band members 10 and 13 disposed substantially at right angles to each other with their convergent ends connected by the zigzag extensions 11 and 12. Extension 11 is substantially at right angles to the band member 10, and the extension 12 is substantially at right angles to the band member 13, the threads being continuous throughout the blank and the edge margins being selvedged except at the cut ends of the blank.

Figure 2:
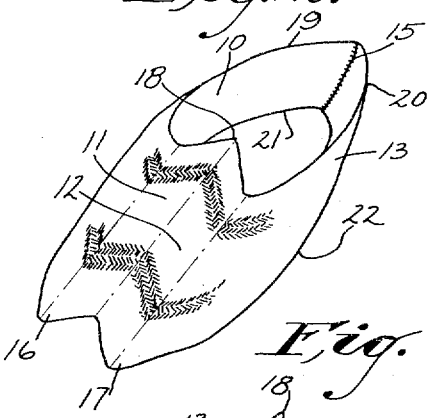
Figure 2 is a perspective view of the blank after its ends have been connected to form a heel portion.
Figure 3:
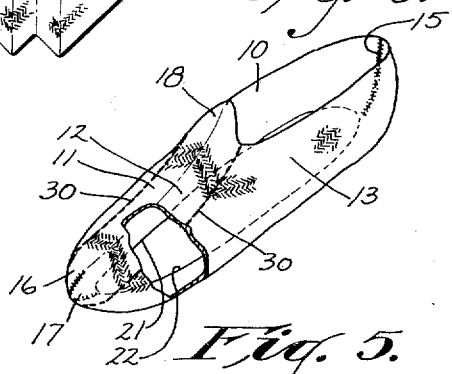
Figure 3 is a view of the same with portions connected to form a shoe toe, and with the lower margin shaped for connection with a sole.
Figure 4:
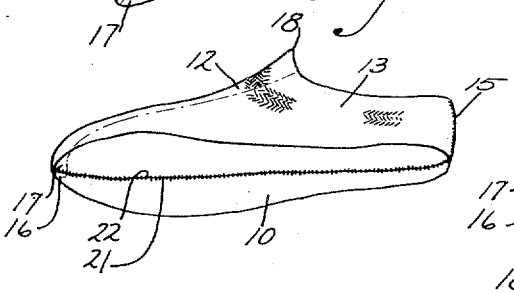
Figure 4 is a perspective view of a completed article of footwear formed by stitching together the lower selvedged margins of the blank to form a sole.
Figure 5:
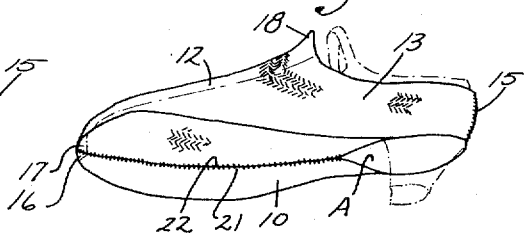
Figure 5 is a view of a modified form of footwear in which the lower selvedged margins of the partially formed shoe shown in Figure 3 have been only partially connected, the heel portion being left open to allow the device to be slipped over an ordinary shoe for service as a foot warmer.
Figure 6:
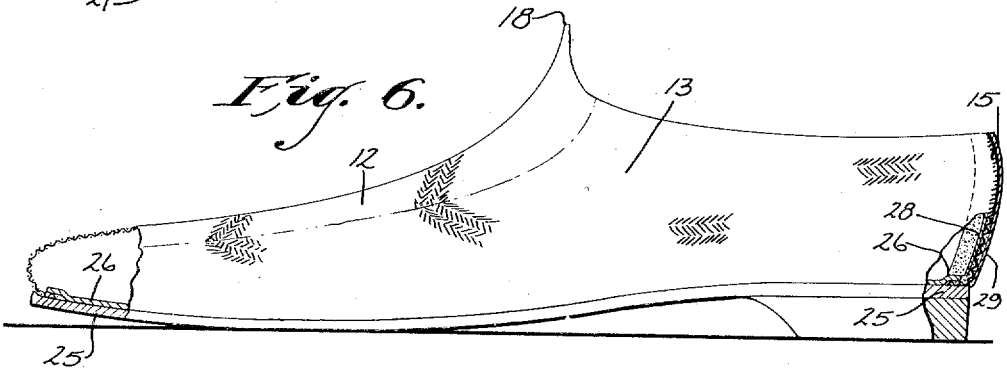
Figure 6 is a side view of a shoe having a leather sole and a knitted upper formed from the blank shown in Figure 1 after it has been shaped and portions connected by stitching, as illustrated in Figure 3, the completed shoe being shown in Figure 6 on an enlarged scale with heel and toe portions broken away in vertical section.

By then connecting or stitching together the cut ends of the blank as indicated at 15 in Figure 2 and lifting the zigzag extensions 11 and 12 the two triangular projections 16 and 17 may have their margins stitched together to form a shoe toe, as indicated in Figure 3. The portions 11 and 12 will then constitute the instep covering portion of the upper, and the single triangular projection 16 will extend upwardly along the instep to a point above the selvedged top margins 17 and 18 which embrace the ankle. The opposite margins 19 and 20 of the band members 10 and 13 may be turned inwardly and stitched together throughout their length, as indicated in Figure 4, or for a portion of their length from the toe backwardly, thus leaving a heel opening, as clearly shown in Figure 5. This heel portion is left open if the footwear is to be used as a foot warmer to be slipped over an ordinary shoe. When the article is used as a foot warmer it is desirable to allow the heel of the shoe to project through the opening, as shown at A in Figure 5.

If desired, the partially completed shoe illustrated in Figure 3 may have the lower margins of the members 10 and 13 secured to a sole 25 formed of leather or other suitable material. In that event the lower margins of the members 10 and 13 will be slightly inturned, as indicated in Figure 3, and secured to the upper surface of the sole 25 by any suitable means, preferably by cementing these selvedged edges to the leather sole and covering them with an insole 26 which may also be cemented to the marginal portions interposed between the insole margins and the sole 25. A waterproof celluloidal cement will be preferred, although rubber cement may be used. The insole may also be cemented directly to the sole 25 in the central portion between the engaged margins of the knitted material.

A strip 28 of any suitable material may be cemented or otherwise secured to the inner surface of the heel portion to reenforce the heel, and if desired, a similar strip 29 may be secured to the outer surface to cover the stitched joint 15. Also, the instep covering portions 11 and 12 will preferably be reenforced by lines of stitching 30 at their junctions with the end portions 10 and 13, respectively. This stitching and also the reversal of the directional pitch of the ribs or wales along these lines and along the center line of the instep, which also has an elastic reenforcing effect, serve to prevent bagging and cause the footwear to conform to the foot of the wearer.

If the knitted fabric is formed with a rib stitch the ribs will extend longitudinally in the upper along the sides of the shoe and upwardly and inwardly from each side to the center line of the instep at the junction of the zigzag extensions 11 and 12. The triangular upward projection at the top of the instep will not only provide an attractive feature, but this projection may be utilized as a pull-on piece and as a means for protecting the front of the ankle.

I claim:

1. As a new article of manufacture, a knitted blank from which to manufacture footwear, said blank having selvedged side margins and comprising obliquely pitched convergent end portions connected at their

BEST AVAILABLE COPY convergent ends by relatively short zigzag extensions forming a pair of triangular projections at the outer side of the angle formed by the end portions, with a central triangular projection at the inner side of such angle, the end portions being of substantially the length of the footwear to be formed from the blank, and the zigzag connecting portions being adapted to form the instep covering portion of the upper.

2. As a new article of manufacture, a knitted blank from which to construct footwear, comprising elongated convergent end portions adapted to form sides for the article of footwear, said end portions having wales running longitudinally, and a zigzag instep covering portion having wales extending obliquely from each end portion to the center line of the blank, and threads being continuous with those of the end portions.

3. As a new article of manufacture, a continuously knitted blank from which to construct footwear, comprising a zigzag strip having a central portion, the wales of which extend obliquely and divergently from the center line of the blank, elongated end portions having wales oblique to their associated wales in the central portion, and transverse reenforcing stitching at the junctions of the end portions with the instep covering portion.

4. As a new article of manufacture, a knitted blank from which to construct footwear, comprising an instep covering portion having zigzag wales extending upwardly from each side to the center line of the instep, and elongated end portions adapted to form sides for the article of footwear, said end portions having wales running longitudinally and their threads being continuous with those of the zigzag instep covering portions, the wales of the end portions and associated instep covering portions being extended at their junctions to form a pair of triangular projections adapted to be stitched together to form a toe covering.

5. The process of making knitted footwear consisting in continuously rack knitting a blank forming strip composed of bands extending alternately in oppositely pitched directions oblique to the general center line of the strip, and comprising single bands, each of approximately double the desired length of the footwear, and interposed short oppositely pitched bands of a combined area sufficient to comprise the instep and toe portions; medially severing said long bands to form blanks having elongated end portions connected by relatively short zigzag instep and toe covering portions; stitching the severed ends together to form a heel and stitching the oblique margins of the toe covering portions together to form a toe; and then connecting the lower selvedged edges of the relatively long bands to form a sole.

6. The process of making knitted footwear consisting in rack knitting a blank having elongated end portions converging in one direction and connected at their covergent ends by relatively short portions having wales obliquely pitched in opposite directions in the respective portions, and with the wales of each central portion pitched in a direction opposite to that of the wales in the associated end portion, whereby the central portion of the blank is provided with two triangular projections on the outer side of the angle formed by the end portions and a single central triangular projection on the inner side of such angle, then connecting the other ends of said end portions to form a heel and stitching together the selvedged margins of said pair of triangular projections to form a toe.

7. The process of making knitted footwear consisting in rack knitting a blank having elongated end portions converging in one direction and connected at their convergent ends by relatively short portions having wales obliquely pitched in opposite directions in the respective portions, and with the wales of each central portion pitched in a direction opposite to that of the wales in the associated end portion, whereby the central portion of the blank is provided with two triangular projections on the outer side of the angle formed by the end portions and a single central triangular projection on the inner side of such angle, then connecting the other ends of said end portions to form a heel, stitching together the selvedged margins of said pair of triangular projections to form a toe and inserting a reenforcing thread along the junction lines of the end portions with the relatively short zigzag central portions.

8. Knitted footwear having selvedged ankle embracing portions, an instep covering portion having wales pitched in opposite directions from a center line, and side portions having wales continuous with the zigzag instep covering portion and extending parallel to the selvedged ankle encasing margin, said side portions having their ends connected to form a heel.

9. Knitted footwear comprising an instep covering portion having wales pitched in opposite directions from a center line and side portions having wales extending longitudinally, said side portions being connected with each other at the heel and having selvedged instep embracing margins.

10. Knitted footwear comprising an instep covering portion having wales pitched in oposite directions from a center line and side portions having wales extending longitudinally, said side portions being connected with each other at the heel and having selvedged instep embracing margins, and an auxiliary reenforcing thread extending along the junction lines of the instep covering portions with said side portions.

BEST AVAILABLE COPY

11. Knitted footwear comprising continuously knitted instep covering portions and side portions having wales pitched in opposite directions with the wales in the instep covering portions extending downwardly and forwardly from a center line, with the outer margins selvedged and stitched together to form a toe, composed in part of such portions and in part of the associated ends of the side portions, said side portions having their opposite ends connected at the heel with their upper selvedged edges forming an ankle embracing margin for the footwear, and their lower selvedged edges connected to form a sole.

12. Knitted footwear having wales extending longitudinally in the side portions and in the lower portions of the toe and convergently upwardly in the upper part of the toe portions and instep covering portions to the center line of the instep, said knitted portions of the footwear having selvedged top and bottom margins.

13. Knitted footwear of the shoe or slipper type having longitudinally extending wales in the side portions, connected across the toe and instep by wales extending at an angle to those in the side portions from the point of the toe to the ankle encircling margin, and having selvedged margins at the ankle and along the sole, said toe and instep covering wales being continuous with the side wales along lines of deflection extending from the angle embracing selvedged margins to the selvedged sole margins.

14. Knitted footwear of the shoe or slipper type, composed of knitted bands, the wales of which extend longitudinally in the side portions and have transverse continuations in the top of the toe and instep portions, with the side portions of said bands selvedged and forming ankle embracing and sole portions.

15. Knitted footwear composed of knitted rib stitched bands, having selvedged ankle and sole margins, said bands having wales which extend longitudinally in the side portions, with abrupt bends at the sides of the toe and instep portions, said wales extending transversely across the toe and instep portions along lines which are also oblique with reference to the center line of the toe and instep.

16. Knitted footwear having a selvedged ankle embracing margin, the sides and instep covering portions being continuously knitted, with an abrupt deflection of the wales at the junctions of the side portions with those of the instep covering portion, along lines extending from said selvedged margin forwardly and downwardly to the sole in the vicinity of the toe.

17. Knitted footwear, the instep and toe portions of which have selvedged margins at the angle and along the toe portion of the sole, the wales of said portions being transversely disposed and continuous with those of the associated side portions at an angle thereto along lines of deflection extending from the ankle embracing margin to the sole at the respective sides of the toe.

ELMER N. JOHA.